(12) United States Patent
Bartels

(10) Patent No.: US 10,958,490 B2
(45) Date of Patent: Mar. 23, 2021

(54) TRANSPONDER WITH HIGH-FREQUENCY DEMODULATOR OPTIMIZED FOR ANALOG-DIGITAL MIXED OPERATION

(71) Applicant: IQ-Mobil GmbH, Eschenlohe (DE)

(72) Inventor: Oliver Bartels, Munich (DE)

(73) Assignee: IQ-Mobile GmbH, Eschenlohe (DE)

( * ) Notice: Subject to any disclaimer, the term of this patent is extended or adjusted under 35 U.S.C. 154(b) by 0 days.

(21) Appl. No.: 16/469,070

(22) PCT Filed: Jan. 26, 2018

(86) PCT No.: PCT/EP2018/051981
§ 371 (c)(1),
(2) Date: Jun. 12, 2019

(87) PCT Pub. No.: WO2018/153616
PCT Pub. Date: Aug. 30, 2018

(65) Prior Publication Data
US 2020/0076656 A1    Mar. 5, 2020

(30) Foreign Application Priority Data
Feb. 26, 2017    (DE) .......................... 102017103974.0

(51) Int. Cl.
*H04W 4/80* (2018.01)
*H04L 27/12* (2006.01)
(Continued)

(52) U.S. Cl.
CPC .......... *H04L 27/12* (2013.01); *G06K 7/10346* (2013.01); *G06K 19/0717* (2013.01)

(58) Field of Classification Search
CPC ...... H04B 5/00; H04B 5/0025; H04B 5/0031; H04B 5/0037; H04B 5/0043;
(Continued)

(56) References Cited

U.S. PATENT DOCUMENTS 6,664,770 B1    12/2003    Bartels
2009/0040022 A1*  2/2009    Finkenzeller ........ G06K 7/0008
340/10.1
(Continued)

FOREIGN PATENT DOCUMENTS

DE        19702768        4/1998
DE        102007049560    4/2009
(Continued)

*Primary Examiner* — Philip Sobutka
(74) *Attorney, Agent, or Firm* — Head, Johnson, Kachigian & Wilkinson, PC

(57) ABSTRACT

The invention relates to a transponder that transmits measurement values that does not have an energy source of its own, which draws energy from a radio field and that includes a novel input circuit to demodulate the high frequency. The novel circuit facilitates using the transponder for digital identification and measurement purposes respectively with a high level of efficiency. Intelligent coupling of a conventional full wave diode rectifier with an inductivity and a switching element, advantageously a MOSFET providing power for a digital circuit is facilitated as well as providing power for an analog quartz sensor, herein the power is always conducted into the path where it is required. Additionally the quartz sensor arrangement is activated or deactivated at will by precisely one switching element and an increased output voltage for the digital circuit is generated by smart modulation of the high frequency feed signal using the inductivity.

12 Claims, 1 Drawing Sheet

Figure 1:
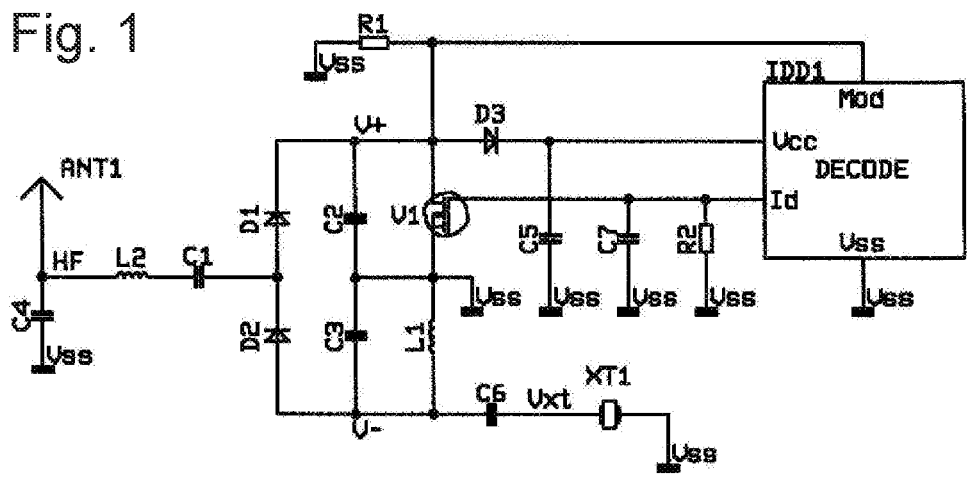

(51) Int. Cl.
*G06K 7/10* (2006.01)
*H04B 5/00* (2006.01)
*G06K 19/07* (2006.01)

(58) Field of Classification Search
CPC .. H04B 5/0056; H04B 5/0062; H04B 5/0068; H04B 5/0075; H04W 4/008; H04W 4/80; H04W 12/00407; G06K 19/0717; G06K 19/0713; G06K 19/0716; G06K 19/0723; G06K 7/10346; H04L 27/12
USPC .................................... 455/41.1, 41.2, 41.3
See application file for complete search history.

(56) References Cited

U.S. PATENT DOCUMENTS

2013/0099897 A1  4/2013  Forster
2016/0328637 A1* 11/2016  Viikari ............... G06K 19/0717

FOREIGN PATENT DOCUMENTS

| DE | 102010028991 | 6/2011 |
|----|--------------|--------|
| EP | 1236170 | 6/2001 |
| WO | WO2015101695 | 7/2015 |

* cited by examiner

TRANSPONDER WITH HIGH-FREQUENCY DEMODULATOR OPTIMIZED FOR ANALOG-DIGITAL MIXED OPERATION

It is an object of the invention to read measurement values and identification data from a transponder which does not have an internal source of energy, but which is fed from the radio field. The energy and data transmissions shall thus be performed in the UHF or microwave range in order to keep antennas small.

In order to perform analog measurement transmission without an energy source of its own the invention uses a principle of micro wave fed quartz sensors according to the patent DE 197 027 68 C1 by the same inventor which facilitates analog measurement value transmission in the microwave range using measurement value encoders that oscillate in the base frequency band.

The transponders described therein including quartz sensors are used as an industry standard in the pharmaceutical industry in order to determine and control the temperature in particular processing steps. In this industry it is very important that the mobile transponders are not supplied from an internal battery. On the one hand side because a risk of hazardous chemical substances from the battery and contaminating the medications exists and on the other hand side because the temperature ranges that are being used are outside of the specifications of conventional batteries.

As a matter of principle the wireless transmission of a measurement value according to DE 197 027 68 C1 occurs as follows. A measuring quartz is arranged in the transponder and an oscillating frequency of the measuring quartz is influenced by the variable to be measured. This can be for example directly the temperature by impacting a suitably cut temperature measuring quartz. A regular quartz with a capacitive sensor can be drawn as well.

Transponder with rectifiers are also known from the printed documents DE 10 2007 049 560 A1 and DE 10 2010 028 991 A1.

The measuring quartz is coupled on the one hand side to a diode modulator which generates the modulation signal without rectification from an amplitude modulated signal without internal power supply and coupled on the other hand side to a mixer which can be the same rectifier diode or e.g. a MESFET which also changes its impedance without internal power supply through voltage variations at its gate.

Initially an amplitude modulated microwave signal is transmitted with a modulation frequency close to the resonance frequency of the oscillation quartz to the transponder. This signal is rectified in the transponder and excites the oscillation quartz to oscillate.

In a second step the modulation is turned off after some time and only the micro wave carrier is still being transmitted. The oscillating quartz continues to oscillate for a significant time period at its resonance frequency which is influenced by the value to be measured due to a high quality of the oscillating quartz. These post pulse oscillations can be captured at the quartz and fed to the mixer, in the simplest case through the same current path by which the quartz was initially excited to oscillate.

The post pulse oscillations now periodically change the impedance of the demodulator diode or of the mixer-FETS which generates two side bands in the microwave range when the demodulator diode or the mixer FET is loaded by the microwave carrier. The side bands can now be received by the interrogator and processed with respect to their frequency so that the oscillating frequency of the quartz is determined in the remote interrogator and the measurement value to be transmitted is computed from the oscillating frequency.

A back modulation of this type is designated as back scatter modulation in the art. From the view point of the interrogator the transponder is a radar target which periodically reflects more or less as a function of a change of an impedance of the transponder antenna. Regarding additional details DE 197 027 68 C1 and respective textbooks are being referred to.

For applications in the pharmaceutical industry there is a need to be able to measure the temperature in the same radio field at many different locations during the manufacturing process in order to achieve optimum process parameters and yield in particular for temperature critical processes.

So far separating the measurement values is performed by selecting different frequencies for the temperature measurement quartzes like in a classic channel distribution of the modulation frequency.

Thus, the limited number of frequencies is a disadvantage since the temperature measurement quartzes can only be fabricated in a highly limited frequency range with comparable characteristic curves for technological reasons and on the other hand side also the demodulator circuit has to be adapted to the approximate modulation frequency range. On the other hand side the modulation frequency range that is required for greater temperature changes for an unambiguous transmission of the measuring value without overlap with other transponders need to be provided.

It is a particular difficulty that the temperature measurement quartzes have the tendency to provide temperature based side resonance frequencies which cause interferences in adjacent modulation frequency ranges. This further limits the number of transponders that can be used in parallel.

Additionally customers increasingly request an unambiguous digital identification of the respective transponder to be provided with a large code length for reasons of quality assurance. This cannot be done with a mere separation of the modulation frequencies.

This could lead to the presumption that the principle of quartz sensors with post pulse oscillating measurement value encoder is obsolete with the availability of semiconductors in low voltage processes. This however is not the case because it is rather simple for technological reasons to process a digital identifier however the required analog digital convertor for capturing measurement values and the required oscillators still have a significant voltage and current demand and eventually their precision suffers significantly with variations in power supply that is caused by different propagation of radio signals.

Thus, it is an object of the invention to combine the processing of a digital identifier in a transponder with an analog post pulse processing measurement value encoder and to only switch the analog post pulse oscillating encoder free when the correct identifier is received and furthermore to direct the power flow for very low received powers so that only modules in the transponder are provided with power which require the respective power at this point in time.

Simultaneously a demodulator is required for the microwave signals wherein the demodulator fulfills the technical requirements of a post pulse oscillating measurement value encoder and which provides an output voltage for the digital circuit that is at a maximum.

This is not easily possible in the art since all high frequency switches as well as low frequency switches for the modulation frequency in turn require their own feed.

The problem is solved according to the invention by the transponder described in the independent claim including the new demodulator whose functions are subsequently described based on an embodiment.

Figure 2:
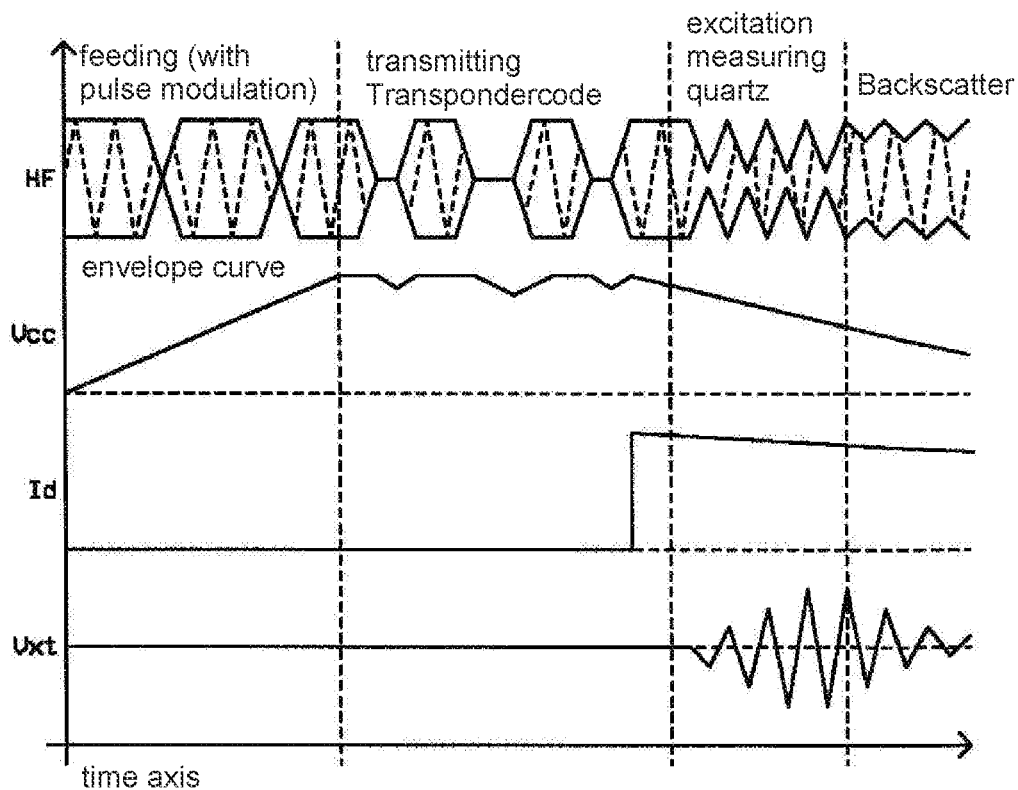

The embodiment in FIG. 1 illustrates a transponder according to the invention. FIG. 2 illustrates essential signals of the circuit of FIG. 1 in a time sequence. First of all the basic configuration will be described.

In the embodiment the receiving antenna ANT1 is connected according to an advantageous embodiment of the invention according to a dependent claim through components C4 and L2 for impedance adjustment with the 2 path rectifier including the 2 diodes D1 and D2 and advantageously according to the dependent claim with the capacitor C1 is essential for separating a constant portion and for doubling the voltage when an impedance adaptation or antenna with DC connection to ground is connected in front. Furthermore L2 and C1 form a serial oscillating circuit which can keep undesirable interference signals out. Both outputs of the full wave rectifier are finished as usual with smoothing capacitors C2 and C3.

While a first output V+ of the full wave rectifier behind D1 in this example with a positive output voltage supplies the active digital electronics in this case an identification code detector IDD1 with the supply voltage VCC through another decoupling circuit including D3 and C5. The other output V− with a negative output voltage is connected through the inductivity L1 to ground (Vss).

According to the dependent claim the diodes D1-D3 should be zero bias diodes or suitably switched semos transistors which become conductive under low voltages. Germanium diodes could also be used; however, cost considerations stand against these meanwhile exotic components.

Additionally the outlet which supplies the active electronics IDD1 can be short circuited by a circuit element VI. In an advantageous embodiment of the invention according to the independence claim the circuit element is a MOSFET whose gate is buffered by the capacitor C7 which discharges only slowly through the resistor R2, the gate itself has high resistance.

Thus, the identification code detector IDD1 can control the MOSFET VI which causes the identification code detector to cut off its own operating voltage but this only occurs after a short time period due to the decoupling through D3 and C5 after the capacitor C7 was already charged at the gate of the MOSFET thereafter the MOSFET VI maintains the short circuit for a time period that is defined by the time constant that results from C7 and R2.

In combination with a suitable excitation scheme this yields surprisingly unusual properties of the full wave rectifier which are used in a novel manner for the transponder.

Initially the full wave rectifier is supplied with a standing high frequency signal-microwave carrier-HF. Since the output V− is closed with respect to AC voltage by an inductivity, this yields the image of a classic voltage doubler which functions so that the capacitor C1 is initially charged during a negative half wave of the high frequency signal when the negative voltage V− shall be generated but the negative voltage is short circuited by L I.

With the positive half wave the voltage at C1 is added and generates approximately twice the voltage compared to the peak voltage of the half wave at the smoothing capacitor.

In a particularly advantageous embodiment of the invention according to the dependent claim the fact can be used that a current flows through the inductivity L1 and stores energy in the magnetic field. However, when the high frequency supply is interrupted quickly the inductivity tends to maintain the current flowing through it due to self-induction.

This also causes a change of polarity of the voltage at L1 since L1 changes from being a current consumer into being a current source. This generates a rather high induction voltage which provides a rather high output voltage at the smoothing capacitor when conducted through D2 and D1. The principle an external timing corresponds to the U.S. Pat. No. 6,664,770 B1 or EP 1 236 170 B1 by the same inventor but with an inverter inductivity that is integrated into the demodulator.

In FIG. 2 this corresponds to the feed section. At the end of this section the capacitor C5 should be charged enough so that regular operations of the active digital electronics are facilitated.

In the section transponder code transmission a transponder code is transmitted by additional drops in the high frequency, e.g. by pulse length coding that is known in the art. For example a short interruption can represent a 0-bit, a long interruption however can represent a 1-bit. Sixteen interruptions can thus address $2^{16}$ transponders. Additional interruptions can be used for transmitting a code that recognizes or corrects transmission errors.

Thus, decoupling the supply voltage Vcc from the output of the full wave rectifier facilitates that the code detector IDD1 detects short interruptions of the feed through its input Mod and can process them as identification code. The resistor R1 provides that the drop is detectable since it accelerates a voltage reduction at the filter capacitor C2. The resistor, however, must not be small enough so that a significant amount of power is dissipated at the resistor that impairs the supply of the active electronics.

This yields time based requirements with respect to the duration of the interruption due to the time constant, however, the detection of an interruption can be accelerated in that e.g. the supply voltage Vcc is used as a reference like in the prior art. Thus, e.g. an emitter of a transistor or the source connection of a FET can be connected with Vcc whereas the input Mod is run to the base or the gate.

At the end of this section the identification code detector IDD1 has determined whether the code is associated exactly with this transponder or not. If not the identification code detector simply remains inactive.

In case of correct association however the identification code detector IDD1 will raise the output ID to the voltage Vcc, C.f. FIG. 2. This output is advantageously implemented as open drain, however not against ground but against Vcc in order to prevent an undesirable discharge of the capacitor C7 after the supply voltage fails. As already recited supra this short circuits the output of the full wave rectifier V+.

In the next section the excitation of the measuring quartz is performed according to patent DE 197 027 68 C1 with an amplitude modulation of the high frequency carrier. This yields surprisingly that an excitation of this type is only performed for the transponder whose output V+ has been shortened. Namely only for this transponder a large current flow is forced through the inductivity L1, the full wave rectifier switches from primarily voltage generating operations into primarily current generating operations. Thus the transponder is activated for analog measurement and the modulation frequency is visible now at the output V−. In other transponders without active VI the amplitude modulation for excitation however dissipates due to a lack of significant current flow through C2, C5 and does not lead to an output of a significant modulation frequency 2V−. These properties are furthermore augmented by a non-linearity of the diodes.

In the demodulator with a short circuited output V+, however, the modulation frequency at V− is measure able with a large amplitude. This large amplitude is further augmented according to the dependent claim in that the inductivity Li forms a resonance circuit together with the smoothing capacitor C3 wherein the resonator circuit is tuned approximately to the modulation frequency. Thus even a voltage reversal occurs at V− with a reduction of amplitude, this means an output voltage that is positive for short time periods.

Simultaneously the power received via high frequency is used in an optimum manner because no power has to be dissipated through resistance due to the current control of the inductivity in order to convert the dropping high frequency amplitude in phases of low high frequency power of the amplitude modulation into a dropping voltage V−, this is performed by the inductivity L1.

The modulation frequency thus provided can excite the measuring quartz XT1 to oscillate according to DE 1 970 27 68 C1 through the capacitor C6. The oscillation builds up slowly due to the weak coupling through C6, c.f. signal Vxt in FIG. 2. When a sufficient amount of oscillation energy is stored in the measuring quartz XT1 than this section is concluded by the time based control of the interrogator.

In the last section the interrogator only transmits a constant carrier wave in the illustrated advantageous embodiment of the invention according to the dependent claim the resonance frequency of the measure of the measuring quartz XT1 which corresponds to the value to be measured is transmitted backward through the capacitor C6 onto the rectifier diode D2. In the rectifier diode an amplitude modulation of the high frequency signal is performed by mixing with the high frequency signal wherein the amplitude modulation is radiated in a back scatter by two side bands at the antenna ANTI according to DE 197 02 768 C1 wherein the back scatter can be measured in turn by the interrogator. From the distance of the side bands from the carrier the resonance frequency of the measuring quartz XT1 and thus the value to be measured can be derived in turn. Certainly the back scatter modulation can also be caused by a separate element e.g. a MESFET with a gate coupled to the signal Vxt.

At some time after interrogation of the measuring value the capacitor C7 is discharged through the resistance R2. The short circuit of V+ through the MOSFET V1 is removed and the transponder can be interrogated again.

An additional increase of the output voltage is conceivable in certain cases by an additional use of a rectifier cascade, however this requires additional HF power due to the unavoidable real internal resistance of the diodes. In this internal resistance unfortunately the high frequency power is converted into heat since a perfect diode is impossible without external feed according to the second theorem of thermal dynamics. Otherwise a diode of this type could convert the thermal background noise into use able electrical energy which violates the second theorem. In this context it needs to be evaluated whether impedance measurement and using exactly 2 rectifier diodes is more efficient in particular for low input powers.

In case a separate MESFET is used for the back scatter instead of a back mixing through a provided rectifier diode the separate MESFIT could be used additionally directly by the digital component according to the prior art in order to transmit information separate from the analog measurement regarding the pure detection of the identification code back to the interrogator. In principle the MOSFET that is used for short circuiting V+ is also useable for this purpose since the short circuit also leads to an impedance change that is perceivable at the antenna. However it is appreciated that the gate was additionally capacitance loaded with a capacitor in order to implement the time constant for the analog interrogation. Thus it makes more sense to use an additional MOSFET or MESFET.

It would also be conceivable to use different frequencies for the different sections excitation and interrogation, e.g. to perform the identification process in the 868 MHz SRD band and to perform the analog measurement value transmission in the 2.45 GHz ISM band. This however causes more complexity in the development of the adaptation of the antenna and of the demodulator for 2 frequency bands. On the other hand side the permissible higher transmitting power in the narrow SRD band can be used for a safe narrow band digital interrogation. In spite of the conceivable separation of the modes by frequency selective filters the advantage of the invention is maintained, since filters of this type that are smaller typically do not have a high level of selectivity.

Another circuit option is to perform a parallel arrangement of the diodes D1 and D3 in the embodiment instead of a serial arrangement in order to decouple the switching element from the feeding of the electronics. In this case the demodulator would have three outlets, two with identical current direction respectively for the switching element and the digital electronics. Another one with opposite current direction to supply the post-pulse oscillating measurement value encoder. However, the facts stated supra regarding an internal resistance of the diode also apply here.

According to the dependent claim a commercial product will integrate essential components of this circuit in a monolithically integrated circuit in order to be able to miniaturize the transponder and fabricate it in a cost effective manner.

The instant invention facilitates a combination of a digital module for identification with analog measurement methods with a very low 1—IF power with a post pulse oscillating measurement value encoder with high efficiency in the field of radio field fed transponders for transmitting measurement values for the first time and facilitates an interrogation also from a long distance under adverse conditions since it omits power hungry analog digital converters in the radio field fed transponder.

REFERENCE NUMERALS AND DESIGNATIONS

D1, D2 full wave rectifier
HF high frequency signal
IDD1 digital circuit portion
XT1 temperature measuring quartz
L1 inductivity
V− first output
V+ second output
V1 switching element

The invention claimed is:
1. A transponder with at least one full wave rectifier (D1, D2) for supplying the transponder with energy from a received high frequency signal (HF) and for demodulating the high frequency signal (HF), the full wave rectifier (D1, D2) comprising:
two current paths with different current directions including one output (V+, V−) per current path, the transponder further comprising a digital circuit portion (IDD1) containing digital electronics for evaluating a received code, further comprising a circuit portion for operating a post pulse resonator or quartz or temperature measuring quartz (XT1) for analog determination and transmission of at least one measurement value, characterized in that, a first output (V−) of the full wave rectifier (D1, D2) is DC voltage connected with ground through an inductivity (L1), a second output (V+) of the two way rectifier (D1, D2) from the current path that has a current direction that is opposite to the current direction of the current path of the first output is DC voltage connected to ground through a switching element (V1), the first output (V−) that is terminated by the inductivity (L1) supplies the circuit portion to operate the post pulse oscillating resonator or the quartz or the temperature measurement quartz, the second output (V+) that is terminated by the switching element (V1) supplies the digital circuit portion (IDD1).

2. The transponder according to claim 1, characterized in that, the digital circuit portion (IDD1) actuates the switching element (V1) when a code that is associated with the transponder is detected.

3. The transponder according to claim 1, characterized in that an increased operating voltage for the digital circuit portion (IDD1) is provided by feeding with an amplitude or pulse modulated high frequency signal in that energy is stored in the inductivity (L1) during reception of a high amplitude wherein the energy flows backward through the full wave rectifier (D1, D2) when reducing the amplitude and causes a voltage increase at another output.

4. The transponder according to claim 1, characterized in that an increased output voltage of the two way rectifier (D1, D2) is provided by connecting a capacitor (CI) in front of the full wave rectifier (D1, D2) for voltage doubling or by using an additional rectifier cascade with additional capacitors or diodes in order to provide voltage multiplication.

5. The transponder according to claim 1, characterized in that an increased output voltage of the full wave rectifier (D1, D2) is caused by an impedance adaptation (L2, C4) in front of the full wave rectifier (D1, D2).

6. The transponder according to claim 1, characterized in that a back scatter modulation of the high frequency signal is caused by using a diode (D2) or a non-linear element in the full wave rectifier (D1, D2) as an additional passive mixer.

7. The transponder according to claim 1, characterized in that the full wave rectifier (D1, D2) includes zero bias diodes or FET transistors as rectifier diodes.

8. The transponder according to claim 1, characterized in that at least one MOSFET (V1) is used as a switching element wherein the at least one MOSFET can be closed for a predetermined time period by additionally connecting it with at least one passive time component when the supply of the digital electronics through controlling the MOSFET is discontinued in favor of supplying the circuit portion for analog determination and transmission of a measurement value.

9. The transponder according to claim 1, characterized in that the inductivity (L1) which connects the first output (V−) of the full wave rectifier (D1, D2) to ground forms a resonance circuit together with a smoothing capacitor (C3) wherein the resonance circuit provides an alternating current to excite the resonator or the quartz or the temperature measurement quartz (XTI) with increased amplitude when the switching element (V1) is closed and when an amplitude modulation of the high frequency signal (HF) is provided proximal to the resonance frequency of the resonance circuit.

10. A monolithic integrated circuit for a transponder according to claim 1, characterized in that the full wave rectifier (D1, D2), the switching element (V1) and the digital circuit portion (IDD1) are integrated in order to process the received code in the high frequency (HF) signal.

11. A method for obtaining at least one measurement value using a transponder containing a quartz resonator with a resonance frequency depending from the value(s) to be measured, which is supplied with energy from a received high frequency signal, which method comprises the following steps:

rectifying and demodulating the high frequency signal using a full wave rectifier;

feeding the transponder with energy using the high frequency signal;

modulating the high frequency signal with a digital code identifying the transponder;

modulating the high frequency signal with an appropriate excitation frequency of the quartz resonator; and transmitting the high frequency signal without modulation, so that the resonance frequency of the quartz resonator modulates the high frequency signal as a backscatter signal.

12. The method according to claim 11, wherein the transponder is fed with energy using a pulse-modulated high frequency signal.

* * * * *